UNITED STATES PATENT OFFICE.

NATHANIEL HAYWARD, OF WOBURN, ASSIGNOR TO CHARLES GOODYEAR, OF BOSTON, MASSACHUSETTS.

IMPROVEMENT IN THE MODE OF PREPARING CAOUTCHOUC WITH SULPHUR FOR THE MANUFACTURE OF VARIOUS ARTICLES.

Specification forming part of Letters Patent No. 1,090, dated February 24, 1839.

*To all whom it may concern:*

Be it known that I, NATHANIEL HAYWARD, of the town of Woburn, county of Middlesex, in the State of Massachusetts, have made a new and useful Improvement in the Mode of Preparing Caoutchouc, Gum-Elastic, or India-Rubber for the Manufacturing of Various Articles in which that Substance is Used; and I do hereby declare that the following is a full and exact description thereof.

Sulphur, it is known, is soluble in the essential oils, which also are the solvents usually employed for dissolving caoutchouc, the oil of turpentine being generally employed for that purpose. I take the essential oil—say, oil of turpentine—and I dissolve in it, by digestion, a portion of sulphur, generally using about a tea-spoonful of sulphur when flowered to the quantity of oil of turpentine which is to dissolve a pound of caoutchouc, the exact proportion not being important and that indicated being sufficiently near for all practical purposes. With this solution I proceed as with the ordinary spirits of turpentine. Instead of making this solution of sulphur, I sometimes use the flowers of sulphur or sulphur in fine powder, and incorporate it, in the proportion above indicated, with the gum when brought to a pulpy mass by any of the common solvents or when worked by heated cylinders without any solvent, taking care that it is intimately mixed with the mass.

Another mode of using the sulphur is to apply it to the surface of the gum after it has been spread upon cloth or rolled into sheets, causing it to adhere by pressure or otherwise, after which the gum is to be submitted to the action of metallic salts in the manner described by Charles Goodyear in the specification of Letters Patent obtained by him therefor. The effect of the sulphur in whatever way it may be added to the gum is to cause it to dry more perfectly and to improve the whole substance thereof, rendering it much superior to that prepared by any other combination therewith. The subsequent process of curing or tanning the surface above referred to as patented by Charles Goodyear, removes all the odor of sulphur, and is intended to be generally applied to all articles manufactured as above.

What I claim as my invention, and desire to secure by Letters Patent, is—

The combining of sulphur with gum-elastic, either in solution or in substance, either in the modes above poined out or in any other which is substantially the same, and which will produce a like effect.

In witness whereof I, the said NATHANIEL HAYWARD, have hereunto set my hand this 23d day of November, A. D. 1838.

NATHANIEL HAYWARD.

Witnesses:
C. B. COOLIDGE,
ISAAC STEARNS.